(12) United States Patent
Minami et al.

(10) Patent No.: US 10,730,348 B2
(45) Date of Patent: Aug. 4, 2020

(54) PNEUMATIC TIRE

(71) Applicant: The Yokohama Rubber Co., LTD., Minato-ku, Tokyo (JP)

(72) Inventors: Yuji Minami, Hiratsuka (JP); Masataka Kubota, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 580 days.

(21) Appl. No.: 14/782,562

(22) PCT Filed: Apr. 4, 2014

(86) PCT No.: PCT/JP2014/060022
§ 371 (c)(1),
(2) Date: Oct. 5, 2015

(87) PCT Pub. No.: WO2014/163201
PCT Pub. Date: Oct. 9, 2014

(65) Prior Publication Data
US 2016/0052341 A1    Feb. 25, 2016

(30) Foreign Application Priority Data

Apr. 5, 2013 (WO) .................. PCT/JP2013/060542

(51) Int. Cl.
*B60C 3/04* (2006.01)
*B60C 11/00* (2006.01)
(Continued)

(52) U.S. Cl.
CPC .................. *B60C 3/04* (2013.01); *B60C 9/20* (2013.01); *B60C 9/2009* (2013.01);
(Continued)

(58) Field of Classification Search
CPC .................. B60C 11/0083; B60C 2009/2022
See application file for complete search history.

(56) References Cited

U.S. PATENT DOCUMENTS

2006/0118220 A1*  6/2006  Nguyen .................. B60C 11/00
                                                    152/209.14
2012/0103488 A1   5/2012  Kubota
(Continued)

FOREIGN PATENT DOCUMENTS

CN          102463855          6/2016
DE     10 2011 085 246         5/2012
(Continued)

OTHER PUBLICATIONS

English machine translation of JP2006-111219. (Year: 2006).*
(Continued)

*Primary Examiner* — Robert C Dye
(74) *Attorney, Agent, or Firm* — Thorpe North & Western

(57) ABSTRACT

The present technology pertains to a pneumatic tire (1) comprising: a pair of bead portions (2); sidewall portions (3) connected to the pair of bead portions; and a tread portion (10) connected to the sidewall portions. A ratio between a total width (SW) and an outer diameter (OD) of the pneumatic tire satisfies the relationship SW/OD≤0.3. Moreover, if the length along a tread profile (12) from a first side second reference point (Q1) to a second side second reference point (Q2) is the developed tread width (TDW), and an angle formed between a straight line that connects the second reference points and the profile center (cc), and a straight line parallel to the tire width direction is an amount of depression (θ), the following relationships are satisfied: 0.8≤TDW/SW<1, and 1.5°≤θ≤4.5°.

14 Claims, 4 Drawing Sheets

(51) Int. Cl.
*B60C 11/03* (2006.01)
*B60C 9/20* (2006.01)

(52) U.S. Cl.
CPC ........ *B60C 11/0083* (2013.01); *B60C 11/033* (2013.01); *B60C 11/0332* (2013.01); *B60C 2009/2022* (2013.01)

(56) References Cited

U.S. PATENT DOCUMENTS

| | | |
|---|---|---|
| 2013/0042953 A1 | 2/2013 | Kuwayama |
| 2013/0048173 A1* | 2/2013 | Kiwaki .............. B60C 11/0309 152/209.18 |
| 2014/0158263 A1* | 6/2014 | Hatanaka ................ B60C 3/04 152/209.18 |

FOREIGN PATENT DOCUMENTS

| | | | |
|---|---|---|---|
| EP | 0402303 | * | 12/1990 |
| EP | 1092566 | * | 4/2001 |
| JP | 60-148702 | * | 8/1985 |
| JP | 01-060404 | * | 3/1989 |
| JP | 2001-294018 | * | 10/2001 |
| JP | 2006-111219 | | 4/2006 |
| JP | 2006/111219 | | 4/2006 |
| JP | 2012/091738 | | 5/2012 |
| JP | 2013-028289 | | 2/2013 |
| JP | 2013/028289 | | 2/2013 |
| WO | WO 2011/135774 | | 11/2011 |
| WO | WO2013/014950 | * | 1/2013 |

OTHER PUBLICATIONS

English machine translation of JP60-148702. (Year: 1985).*
English machine translation of JP2001-294018. (Year: 2001).*
English machine translation of EP1092566. (Year: 2001).*
English machine translation of JP01-060404. (Year: 1989).*
International Search Report for International Application No. PCT/JP2014/060022 dated Apr. 28, 2014, 3 pages, Japan.

* cited by examiner

PNEUMATIC TIRE

TECHNICAL FIELD

The present technology relates to a pneumatic tire with improved fuel economy.

BACKGROUND

In the related art, pneumatic tires for reducing rolling resistance have been proposed in order to contribute to lowering the fuel consumption of automobiles such as hybrid automobiles (HV) and electric vehicles (EV) in particular. In recent years, as concern for the environment has increased, there has been a demand for pneumatic tires with a higher contribution to lowering the fuel consumption of automobiles.

Reducing the total width (SW) of a pneumatic tire so that the front projected area (the projected area viewed from the rolling direction of the pneumatic tire) is decreased to reduce the air resistance around the tire is known as a method of reducing the rolling resistance of pneumatic tires (for example, see International Patent Publication No. WO/2011/135774).

However, with the method as described above, the ground contact width is reduced as the total width of the pneumatic tire is reduced, so it is necessary to increase the outer diameter (OD) in order to maintain a constant load capacity. Therefore, the ground contact length of the pneumatic tire becomes comparatively longer.

When the ground contact length of the pneumatic tire is increased, the water drainage properties (wet performance) are greatly improved. On the other hand, by reducing the ground contact width, the cornering force (CF) is reduced, and therefore the steering stability may be reduced.

SUMMARY

The present technology provides a pneumatic tire capable of reducing the rolling resistance and improving the associated degradation in steering stability performance.

According to the present technology, provided is a pneumatic tire, including:

a pair of bead portions; sidewall portions connected to the pair of bead portions; and a tread portion connected to the sidewall portions; wherein a ratio between a total width SW and an outer diameter OD of the pneumatic tire satisfies the relationship $SW/OD \leq 0.3$, a tread profile that is a profile line of a surface of the tread portion in a cross-sectional view in a tire meridian direction is formed by connecting a plurality of arcs with different radii of curvature, including a center portion arc located in a center in a tire width direction, side portion arcs located on an outermost side in the tire width direction of the tread portion, and shoulder side arcs connected to the side portion arcs and located on the outer side in the tire width direction next to the side portion arcs, in a cross-sectional view in the tire meridian direction, when a point of intersection of an extended line of the shoulder side arc and an extended line of the side portion arc on a first side is a first side first reference point, a point of intersection of a straight line passing through the first side first reference point perpendicular to the tread profile and the tread profile is a first side second reference point, a point of intersection of an extended line of the shoulder side arc and an extended line of the side portion arc on a second side is a second side first reference point, a point of intersection of a straight line passing through the second side first reference point perpendicular to the tread profile and the tread profile is a second side second reference point, a length along the tread profile from the first side second reference point to the second side reference point is a developed tread width TDW, a point of intersection of a tire equatorial plane and the tread profile is a profile center, and an angle formed between a straight line that connects the second reference points and the profile center and a straight line parallel to the tire width direction is an amount of depression θ, the relationships $0.8 \leq TDW/SW < 1$ and $1.5° \leq \theta \leq 4.5°$ are satisfied.

According to the present technology, it is possible to provide a pneumatic tire capable of reducing the rolling resistance and improving the associated degradation in steering stability performance.

The present technology can be further sufficiently understood from the following description of preferred embodiments of the present technology together with the attached drawings.

BRIEF DESCRIPTION OF THE DRAWING(S)

DETAILED DESCRIPTION

First Embodiment

Figure 1:
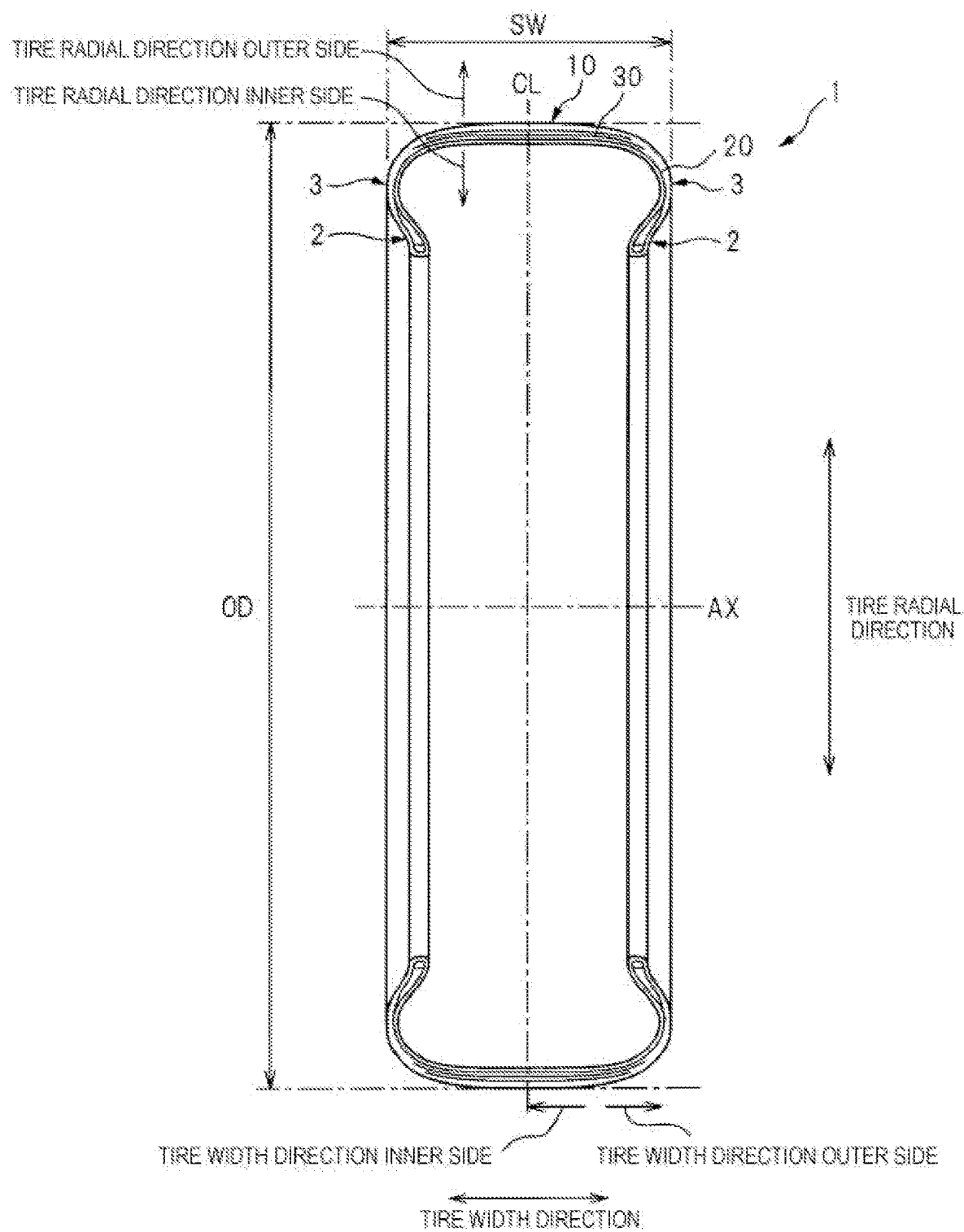
FIG. 1 is a meridian cross-sectional view of a pneumatic tire according to a first embodiment of the present technology.

A pneumatic tire 1 according to a first embodiment of the present technology will now be described with reference to the drawings. FIG. 1 is a meridian cross-sectional view of a whole pneumatic tire 1 according to the first embodiment of the present technology. Here, the meridian cross-sectional shape of the pneumatic tire refers to the cross-sectional shape of the pneumatic tire when viewed on a plane orthogonal to the tire equatorial plane CL.

In the following description, "tire radial direction" refers to a direction orthogonal to the rotational axis AX of the pneumatic tire 1; "inner side in the tire radial direction" refers to the side facing the rotational axis AX in the tire radial direction; and "outer side in the tire radial direction" refers to the side distanced from the rotational axis AX in the tire radial direction. Also, "tire circumferential direction" refers to the direction of rotation about the rotational axis AX as center. Additionally, "tire width direction" refers to the direction parallel to the rotational axis AX; "inner side in the tire width direction" refers to the side toward the tire equatorial plane (tire equator line) CL in the tire width direction; and "outer side in the tire width direction" refers to the side distanced from the tire equatorial plane CL in the tire width direction. "Tire equatorial plane CL" refers to a plane that is perpendicular to the rotational axis AX of the pneumatic tire 1 and that passes through the center of the tire width of the pneumatic tire 1.

In the tire meridian cross-section view, the pneumatic tire 1 according to the first embodiment includes a pair of bead portions 2, sidewall portions 3 connected to the bead portions, and a tread portion 10 connected to the sidewall portions. Also, referring to FIG. 1, the pneumatic tire 1 according to the first embodiment includes a carcass layer 20 that spans between the bead portions 2 via the sidewall portions 3 and the tread portion 10, and a belt layer 30 located on the outer side of the carcass layer 20 in the tire radial direction in the tread portion 10, the same as a conventional pneumatic tire.

In the pneumatic tire 1 according to the first embodiment, the ratio of the total width SW and the outer diameter OD satisfies the relationship $$SW/OD \leq 0.3 \qquad <1>.$$

Here, in the present technology, the total width SW is the interval between the sidewalls including designs on the sidewalls in an unloaded state where the pneumatic tire 1 is assembled on a rim and filled with an internal pressure at 230 (kPa) (optionally set internal pressure) for specifying the size of the pneumatic tire 1, and the outer diameter OD is the outer diameter of the tire at this time. Note that the internal pressure of 230 (kPa) as stated above was selected to specify the dimensions of the pneumatic tire such as the total width SW and the outer diameter OD. All the parameters related to the tire dimensions stated in this Specification are specified at an internal pressure of 230 (kPa) and in the unloaded state. However, it should be noted that provided the pneumatic tire 1 according to the present technology is filled with an internal pressure within the range normally used, the effect of the present technology is exhibited, and filling with an internal pressure of 230 (kPa) is not essential in terms of implementing the present technology.

Here, the rim used in the present technology has a rim diameter adapted to the inner diameter of the pneumatic tire 1 and has a nominal rim width corresponding to the defined rim width Rm (mm) indicated in Table 2 closest to a value determined in conformance with ISO4000-1: 2001 by the product (Rm=K1×Sn) of a nominal tire cross-sectional width Sn and a coefficient K1 set in a table corresponding to Table 1 using the aspect ratio of the rim-assembled tire.

TABLE 1

| Aspect ratio | K1 |
| --- | --- |
| 20-25 | 0.92 |
| 30-40 | 0.90 |
| 45 | 0.85 |
| 50-55 | 0.80 |
| 60-70 | 0.75 |
| 75-95 | 0.70 |

TABLE 2

| Nominal rim width | Rm (mm) |
| --- | --- |
| 3 | 76.2 |
| 3.5 | 88.9 |
| 4 | 101.6 |
| 4.5 | 114.3 |
| 5 | 127 |
| 5.5 | 139.7 |
| 6 | 152.4 |
| 6.5 | 165.1 |
| 7 | 177.8 |
| 7.5 | 190.5 |
| 8 | 203.2 |
| 8.5 | 215.9 |
| 9 | 228.6 |

TABLE 2-continued

| Nominal rim width | Rm (mm) |
| --- | --- |
| 9.5 | 241.3 |
| 10 | 254 |

Figure 2:
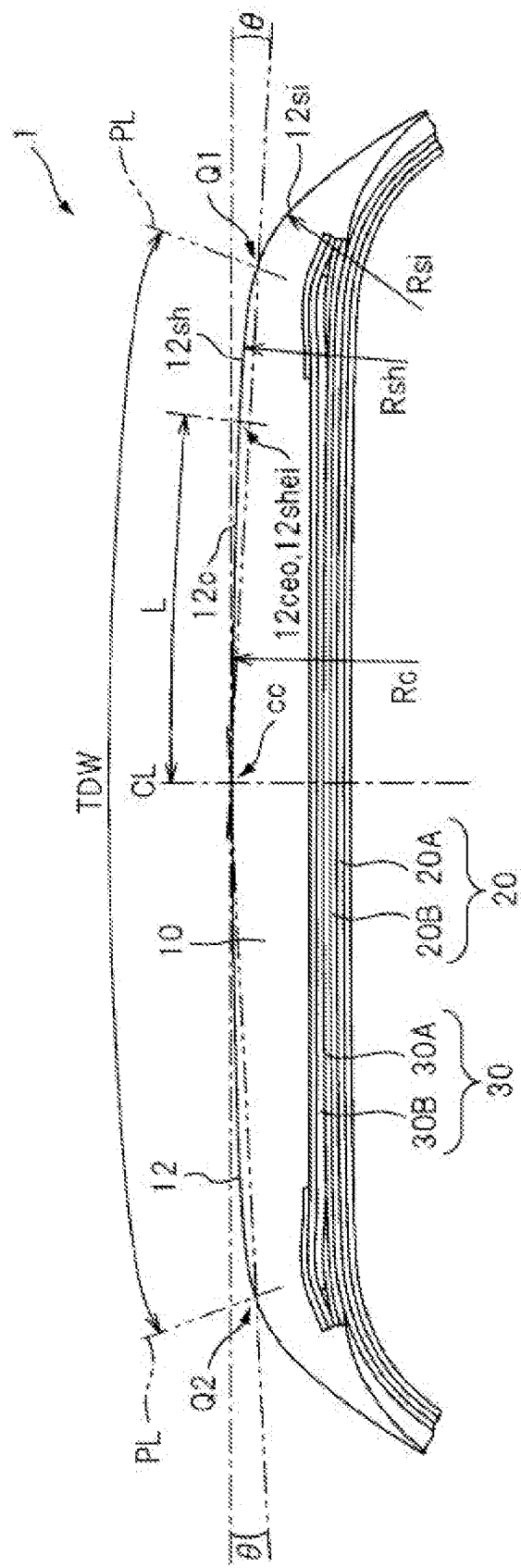
FIG. 2 is an enlarged view of a portion of the tread portion of the pneumatic tire illustrated in FIG. 1.

FIG. 2 is an enlarged view of a portion of the tread portion of the pneumatic tire illustrated in FIG. 1. Note that the pneumatic tire according to the first embodiment is configured as symmetrical about the tire equatorial plane CL, so unless specifically mentioned only the portion located on the right side of the tire equatorial plane CL on the drawings is described.

In FIG. 2, a tread profile 12 is illustrated forming the outer surface of the tread portion 10 of the pneumatic tire 1, and is represented as a profile line in the meridian cross-sectional view. In the pneumatic tire 1 according to the first embodiment, the tread profile 12 is formed by connecting a center portion arc 12c located in the center portion in the tire width direction, a side portion arc 12si located on the outermost side in the tire width direction, and a shoulder side arc 12sh that is continuous with the side portion arc 12si, and is located next to the side portion arc 12si on the outer side in the tire width direction. However, the tread profile 12 may be formed by adding one or a plurality of additional arcs between the center portion arc 12c and the shoulder side arc 12sh, arranged so as to connect them.

Figure 3A:
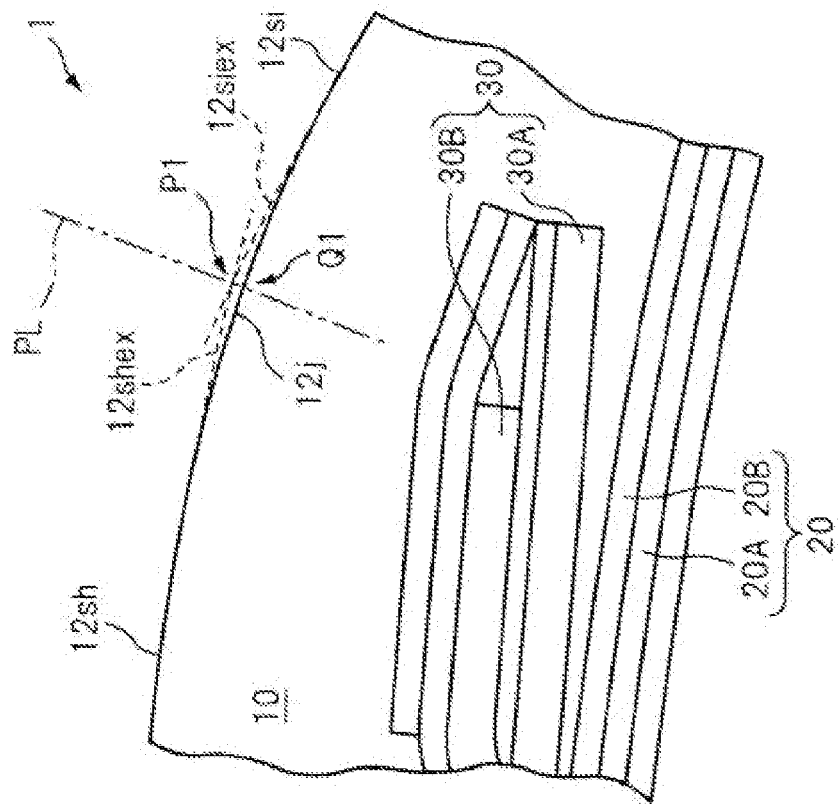
FIG. 3 is an enlarged view in the vicinity of the boundary of the shoulder side arc and side portion arc of FIG. 2.
Figure 3B:
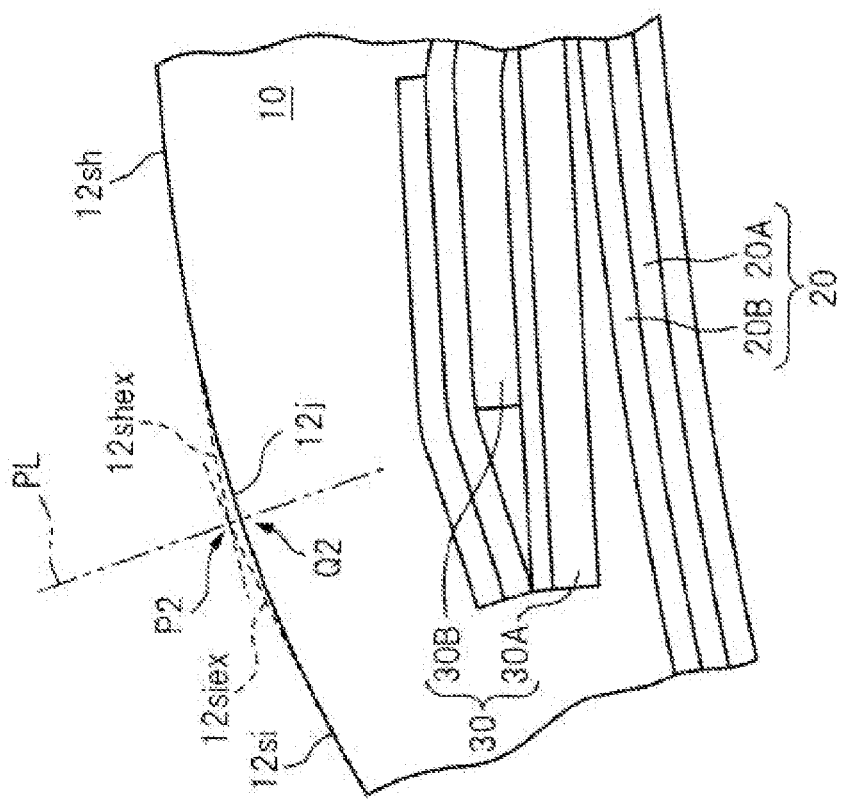

FIG. 3 is an enlarged view in the vicinity of the boundary of the shoulder side arc 12sh and the side portion arc 12si in FIG. 2. FIG. 3A is an enlarged view of a first side (the right side in FIG. 2), and FIG. 3B is an enlarged view of a second side (the left side in FIG. 2). In FIG. 3, the center portion in the tire width direction of the tread portion 10 is omitted. Here, the radii of curvature of the center portion arc 12c, the shoulder side arc 12sh, and the side portion arc 12si are defined as Rc, Rsh, and Rsi respectively.

Referring to FIG. 3A, on the first side, the shoulder side arc 12sh and the side portion arc 12si are smoothly connected via, for example, a curved line segment 12j that is a separate arc. At this time, in the vicinity of the boundary thereof, extended lines 12shex, 12siex that are extensions of the shoulder side arc 12sh and the side portion arc 12si respectively (indicated as dotted lines in the drawing) intersect as illustrated in the drawing. In the present technology, this point of intersection is referred to as the first side first reference point P1, and the point of intersection of the straight line PL (in FIGS. 2 and 3, indicated by a two-dot chain line) that passes through the first side first reference point P1 and is perpendicular to the tread profile 12 and the tread profile 12 is referred to as the first side second reference point Q1.

Referring to FIG. 3B, on the second side, the shoulder side arc 12sh and the side portion arc 12si are smoothly connected via, for example, the curved line segment 12j that is a separate arc. At this time, in the vicinity of the boundary thereof, extended lines 12shex, 12siex that are extensions of the shoulder side arc 12sh and the side portion arc 12si respectively (indicated as dotted lines in the drawing) intersect as illustrated in the drawing. In the present technology, this point of intersection is referred to as the second side first reference point P2, and the point of intersection of the straight line PL (in FIGS. 2 and 3, indicated by a two-dot chain line) that passes through the second side first reference point P2 and is perpendicular to the tread profile 12 and the tread profile 12 is referred to as the second side second reference point Q2.

Note that, although not particularly shown on the drawings, in the pneumatic tire 1 according to another embodiment, the shoulder side arc 12*sh* and the side portion arc 12*si* are not smoothly connected via the line segment 12*j* as described above, but their ends are directly connected. In this case, the points of intersection of the shoulder side arc 12*sh* and the side portion arc 12*si* are the second reference points Q1, Q2. In other words, in this case the first reference points P1, P2 and the second reference points Q1, Q2 overlap, and such a configuration is also included in the present technology.

Also, the length from the first side second reference point Q1 to the second side second reference point Q2 along the tread profile 12 is referred to as the developed tread width TDW.

In this case the pneumatic tire 1 according to the first embodiment is formed so that the ratio of the total width SW to the developed tread width TDW satisfies the relationship $$0.8 \leq TDW/SW < 1 \qquad <2>.$$

The inner configuration, the shape of the tread profile 12, the materials of each of the members of the pneumatic tire 1, and the like can be determined by, for example, prototype testing, simulation, or the like, in accordance with conventional methods, in order that the above Formula <2> is satisfied in the pneumatic tire 1 according to the first embodiment.

Here, the amount of depression θ is defined with reference to FIG. 2. The amount of depression θ is the angle formed between the straight lines connecting the second reference points Q1, Q2 and the profile center cc and a straight line parallel to the tire width direction, when the profile center cc is defined by the point of intersection of the tire equatorial plane CL and the tread profile 12. In this case, the pneumatic tire 1 according to the first embodiment is formed so that the amount of depression θ satisfies the relationship $$1.5° \leq \theta \leq 4.5° \qquad <3>.$$

According to the pneumatic tire 1 of the first embodiment, the following actions and effects can be obtained.

(1) The pneumatic tire 1 of the first embodiment is formed such that the ratio of the total width SW to the outer diameter OD satisfies the relationship in Formula <1>. Accordingly, the total width SW relative to the outer diameter OD is smaller compared with a pneumatic tire of normal size (for example, 205/55R16 (SW/OD=0.32)).

As a result, the front projected area of the pneumatic tire 1 is smaller, so the air resistance around the tire is reduced, and therefore the rolling resistance of the pneumatic tire 1 can be reduced. On the other hand, when just the total width SW is narrowed, the load capacity of the pneumatic tire 1 decreases; however, since the outer diameter OD is relatively large with respect to the total width SW as a result of satisfying Formula <1>, decreases in the load capacity can be prevented.

(2) The pneumatic tire 1 of the first embodiment is formed such that the ratio of the total width SW to the developed tread width TDW satisfies the relationship in Formula <2>. Because the pneumatic tire 1 of the first embodiment satisfies the relationship of Formula <2>, the developed tread width TDW can be increased relative to the total width SW. As a result the ground contact width can be increased, and therefore the steering stability can be improved. The ground contact width is the maximum width in the tire width direction of the ground contact region, the region of the ground contact patch when the pneumatic tire 1 inflated with the internal pressure is brought into contact with a flat surface and a specific load is applied, Note that if "TDW/SW" is smaller than 0.8, sufficient cornering force (CF) cannot be generated, so the effect of improving the steering stability is small. Also for a similar reason preferably the ratio of the total width SW to the developed tread width TDW satisfies the relationship $0.85 \leq TDW/SW \leq 0.95$.

(3) The pneumatic tire 1 according to the first embodiment is also formed such that the amount of depression θ as described above satisfies the relationship in Formula <3>. Because the pneumatic tire of the first embodiment satisfies the relationship of Formula <3>, the amount of depression θ from the profile center cc towards the outer side in the tire width direction is set to be small. Accordingly, the ground contact pressure distribution within the ground contact region when the pneumatic tire 1 makes ground contact with the load applied is more uniform, and therefore the steering stability is improved. Note that if the amount of depression θ is less than 1.5°, the ground contact pressure on the outer side of the ground contact region in the tire width direction is increased, and if the amount of depression θ is greater than 4.5°, the ground contact pressure in the center portion in the width direction of the ground contact region is increased, and therefore the ground contact pressure distribution becomes non-uniform. As a result the effect of improving the steering stability becomes small. Also for a similar reason, preferably the amount of depression θ satisfies the relationship $$2 \leq \theta \leq 4.$$

(4) As described in (1), the pneumatic tire 1 according to the present embodiment has an outer diameter OD that is relatively larger and a total width SW that is relatively narrower compared with a pneumatic tire of normal size. Therefore, it is anticipated that vehicle reduced space occupation, improvement in design, and in addition, improvement in wet performance resulting from the longer ground contact length, in particular resistance to hydroplaning, can be achieved.

Here, the center portion arc length L is defined with reference to FIG. 2. The center portion arc length L is the length from the profile center cc to the inner side end in the tire width direction 12*shei* of the shoulder side arc 12*sh* along the tread profile 12. Note that in the pneumatic tire 1 according to the first embodiment, the inner side end in the tire width direction 12*shei* is located at the same position as the outer side end in the tire width direction 12*ceo* of the center portion arc 12*c* which connects to the shoulder side arc 12*sh*. In this case preferably the tread portion 10 is formed so as to satisfy the relationship $$5 \leq Rc/Rsh \leq 15 \qquad <4>.$$

This is because the ground contact pressure distribution can be made more uniform, and therefore the steering stability can be improved.

In addition, more preferably the tread portion 10 is formed so that in addition to satisfying the relationship of Formula <4>, the tread portion 10 is also formed so as to satisfy the relationship $$0.5 \leq L/(TDW/2) \leq 0.8 \qquad <5>.$$

This is because the ground contact pressure distribution can be made more uniform, and therefore the steering stability can be improved.

Note that if "Rc/Rsh" is smaller than 5, the ground contact pressure on the outer side of the ground contact region in the tire width direction is increased, and if "Rc/Rsh" is larger than 15, the ground contact pressure in the center portion in the width direction of the ground contact region is increased, and therefore the ground contact pressure distribution becomes non-uniform. As a result the effect of improving the steering stability becomes small. Also more preferably the tread portion 10 is formed so as to satisfy the relationship 6≤Rc/Rsh≤12, and even more preferably is formed so as to satisfy the relationship 6≤Rc/Rsh≤11, and yet even more preferably is formed so as to satisfy the relationship 7≤Rc/Rsh≤9.

This is because the ground contact pressure distribution can be made uniform at a higher level, and therefore the steering stability can be further improved.

Also, in addition to satisfying the relationship of Formula <4>, if the tread portion 10 is formed so as to satisfy the relationship 0.6≤L/(TDW/2)≤0.7, the ground contact pressure distribution can be made more uniform, and therefore the steering stability can be improved, which is more preferable.

Also, in the surface of the tread portion 10 of the pneumatic tire 1 of the first embodiment, circumferential grooves (not illustrated) extending in a circumferential direction, lateral grooves (not illustrated) or sipes (not illustrated) extending in a direction that traverses the tire circumferential direction, and the like are provided, as in a normal pneumatic tire. In this case, preferably the groove area ratio GR with respect to the ground contact area in the ground contact region (not illustrated) of the tread portion 10 when the pneumatic tire 1 makes ground contact is preferably 25(%) or less. When the groove area ratio GR is 25(%) or less, the actual area of the footprint of the tread portion 10 is increased compared with a normal pneumatic tire, so the steering stability is improved. For a similar reason, preferably the groove area ratio GR satisfies 13(%)≤GR≤22 (%).

When the groove area ratio GR is smaller than 13(%), there is a possibility that it will be difficult to maintain the water drainage properties.

In the present technology, the ground contact region is the region of the ground contact patch when the pneumatic tire 1 is assembled onto the rim as described above, inflated with an internal pressure of 230 (kPa), and is brought into contact with a flat surface with a load corresponding to 80% of the load capacity applied. The ground contact width is the maximum width in the tire width direction within the ground contact region. The ground contact length is the maximum length in the tire circumferential direction within the ground contact region. In the present technology, the load capacity is determined based on ISO4000-1: 1994. However, the ISO standards describe defining, by calculation on an individual basis, sizes for which a load capacity index is not set therein in consideration of conformance with various foreign standards. In such a case, the load capacities are calculated based on the standards for each country. Accordingly, in the present technology, in practice, the load capacity is calculated for each tire size from the following calculation formula (c) described in the explanation of "Calculation of Load Capacity" in JIS D4202-1994 using the load capacity calculation formula adopted in the JIS standards:

$$X = K \times 2.735 \times 10-5 \times P^{0.858} \times Sd^{1.39} \times (D_R - 12.7 + Sd)$$

where, X=load capacity (kg)
K=1.36
P=230 (=air pressure (kPa))
$Sd = 0.93 \times S_{0.75} - 0.637\ d$
$S_{0.75} = S \times ((180° - Sin^{-1}((Rm/S))/131.4°)$
S=design cross-section width (mm)

$R_m$=rim width (mm) corresponding to design cross-section width
d=(0.9−aspect ratio[−])×$S_{0.75}$−6.35
$D_R$=rim diameter reference value (mm).

Also, the groove area ratio GR is the ratio of the groove area to the sum of the land portion area and the groove area within the ground contact region (=ground contact area).

In addition, more preferably the aspect ratio of the pneumatic tire 1 according to the first embodiment is 55% or less. This is because by giving the pneumatic tire 1 a low aspect ratio, the steering stability can be more significantly improved.

Second Embodiment

Figure 4:
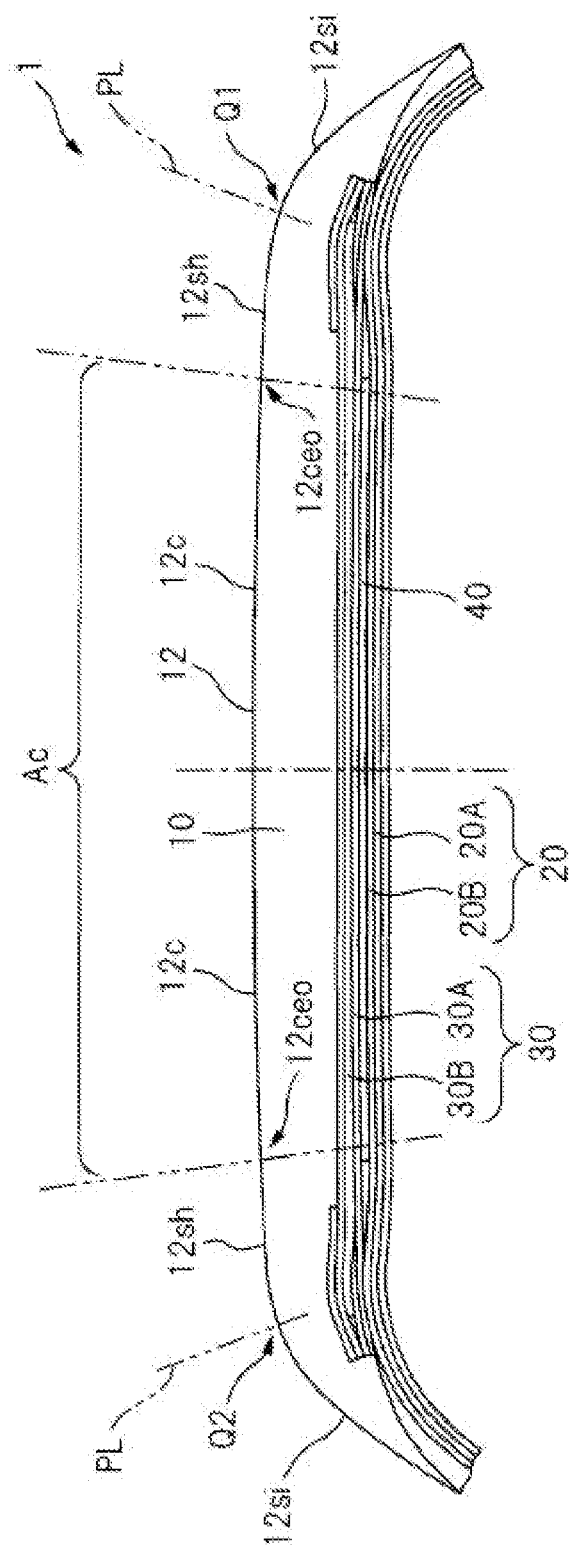
FIG. 4 is an enlarged meridian cross-sectional view of a portion of the tread portion of a pneumatic tire according to a second embodiment of the present technology, similar to FIG. 2.

A pneumatic tire 1 according to a second embodiment of the present technology will now be described with reference to FIG. 4. FIG. 4 is an enlarged meridian cross-sectional view of the tread portion of a pneumatic tire according to the second embodiment of the present technology, similar to FIG. 2. The pneumatic tire according to the second embodiment differs from the first embodiment in that it includes a reinforcing layer 40 that is described later.

Referring to FIG. 2, the pneumatic tire 1 according to the first embodiment includes in the tread portion 10: the carcass layer 20 that includes a first carcass layer 20A located on the inner side in the tire radial direction and a second carcass layer 20B located on the outer side in the tire radial direction; and the belt layer 30 located on the outer side in the tire radial direction from the carcass layer 20. The belt layer 30 includes a first belt layer 30A located on the inner side in the tire radial direction and a second belt layer 30B located on the outer side in the tire radial direction. Referring to FIG. 4, the pneumatic tire 1 according to the second embodiment further includes the reinforcing layer 40 provided between the carcass layer 20 and the belt layer 30. Also the position in the tire width direction of the reinforcing layer 40 is included in a tire width direction region Ac defined by the center portion arc 12c on the tread profile 12.

The reinforcing layer 40 is formed from cords (not illustrated) extending substantially 90° with respect to the tire circumferential direction covered with rubber in layer (sheet) form. In the second embodiment the cords of the reinforcing layer 40 are formed from steel cords. Preferably monofilament cords or a plurality of monofilament cords that have been twisted together are used as the cords of the reinforcing layer 40.

By providing the reinforcing layer 40 in the pneumatic tire 1 of the second embodiment, the belt stiffness is reinforced compared with the pneumatic tire 1 according to the first embodiment, and therefore the tread stiffness is increased, and the steering stability can be improved.

Preferably the reinforcing layer 40 is provided between the carcass layer 20 and the belt layer 30, as in the pneumatic tire 1 of the second embodiment, but it may also be provided on the outer side in the tire radial direction of the carcass layer 20.

Also, in the second embodiment the reinforcing layer 40 is disposed in the tire width direction across the whole tire width direction region Ac that is defined on the tread profile 12 by the center portion arc 12c, but it may be disposed so that it is at least included within the tire width direction region Ac. This so that it can contribute to increasing the belt stiffness.

In the second embodiment the cords of the reinforcing layer 40 are formed from steel cords, but the cords may be formed from a metal or alloy other than steel provided they are capable of increasing the belt stiffness.

Also, the width in the tire width direction of the reinforcing layer 40 is preferably from 25% to 75% both inclusive of the width in the tire width direction of the belt layer of the belt layer 30 disposed on the outermost side in the tire radial direction, that is, in the second embodiment, the second belt layer 30B. This is because if the width in the tire width direction of the reinforcing layer 40 is narrower than 25%, it will not be possible to generate sufficient cornering force (CF), so there is a possibility that sufficient steering stability improvement effect will not be exhibited, and if it is wider than 75%, there will be no further steering stability improvement effect. For a similar reason, more preferably the width in the tire width direction of the reinforcing layer 40 is from 40% to 60% both inclusive of the width in the tire width direction of the second belt layer 30B.

Examples

Various tire performance tests, such as RRC index, fuel efficiency index, and steering stability were carried out under various conditions on pneumatic tires according to working examples.

In these performance tests, each test tire was assembled onto a rim with a compatible size as described above, and were filled to an internal pressure of 230 kPa for the actual vehicle tests.

The following is a description of the test methods for the performance tests carried out on the test tires.

(RRC Index)

Using a drum test machine with a drum diameter of 1707.6 mm, the rolling resistance was measured in accordance with ISO 28580, under the conditions of air pressure of 210 kPa, and speed of 80 km/h. The evaluation results were expressed using the inverse value as the measurement value, indexed with the conventional example being 100. Lower index values indicate less rolling resistance.

(Fuel Efficiency)

The test tires were mounted on a front wheel drive vehicle with 1800 cc displacement, the vehicle traveled at 100 km/h on a test course with a total length of 2 km for 50 laps, and the fuel consumption improvement rate was measured with the fuel consumption rate of a Conventional Example set as 100. A higher index represents better fuel economy.

(Steering Stability)

The test tires were rim-assembled with standard rims and mounted on a passenger car (displacement 1800 cc) and the feeling when traveling three laps on a test course where one lap is 2 km while changing lanes was evaluated by three expert drivers. The evaluation results for the average value of the evaluation points for each test tire was expressed as an index, with the average value of the feeling evaluation points of Comparative Example 1, which is described later, as 100. A larger index value indicates a superior steering stability.

Description will now be given of each of the test tires and the performance test results thereof.

Conventional Example

The pneumatic tire according to a Conventional Example had a tire size of 205/55R16 and the value of "SW/OD" was 0.32, that is, Formula <1> was not satisfied. The tread portion of the pneumatic tire according to the Conventional Example was provided with the tread pattern illustrated in FIG. 4.

Working Examples 1 to 14

The pneumatic tires according to Working Examples 1 to 14 had various tire sizes and "SW/OD" had a value in a range of 0.30 to 0.21, that is, Formula <1> was satisfied. On the tread portion 10 of the pneumatic tires according to Working Examples 1 to 14, tread patterns were provided based on the tread pattern illustrated in FIG. 4, modified to conform to each tire size.

Performance tests for RRC index and fuel efficiency index were carried out for the Conventional Example and Working Examples 1 to 14. Table 3 illustrates the values relating to the dimensions of each test tire and the performance test results.

TABLE 3

| | Conventional Example | Working Example 1 | Working Example 2 | Working Example 3 | Working Example 4 | Working Example 5 | Working Example 6 | Working Example 7 |
|---|---|---|---|---|---|---|---|---|
| Nominal Width | 205 | 185 | 195 | 175 | 185 | 155 | 165 | 175 |
| Aspect ratio | 55 | 55 | 50 | 60 | 50 | 60 | 55 | 50 |
| Inner diameter (inches) | 16 | 17 | 18 | 17 | 19 | 17 | 18 | 20 |
| Outer diameter (mm) | 631.9 | 640.8 | 657.2 | 647.8 | 672.6 | 623.8 | 644.2 | 688 |
| SW/OD | 0.32 | 0.30 | 0.30 | 0.28 | 0.28 | 0.26 | 0.26 | 0.26 |
| RRC index | 100 | 99 | 99 | 98 | 98 | 98 | 96 | 96 |
| Fuel efficiency index | 100.0 | 100.1 | 100.1 | 100.1 | 100.1 | 100.1 | 100.2 | 100.1 |

| | Working Example 8 | Working Example 9 | Working Example 10 | Working Example 11 | Working Example 12 | Working Example 13 | Working Example 14 |
|---|---|---|---|---|---|---|---|
| Nominal Width | 145 | 155 | 165 | 145 | 155 | 145 | 145 |

TABLE 3-continued

| Aspect ratio | 65 | 60 | 55 | 70 | 60 | 65 | 55 |
|---|---|---|---|---|---|---|---|
| Inner diameter (inches) | 17 | 19 | 20 | 17 | 20 | 19 | 21 |
| Outer diameter (mm) | 626.8 | 674.6 | 695 | 641.8 | 700 | 677.6 | 698.4 |
| SW/OD | 0.24 | 0.24 | 0.24 | 0.23 | 0.23 | 0.22 | 0.21 |
| RRC index | 97 | 95 | 96 | 95 | 93 | 94 | 93 |
| Fuel efficiency index | 100.2 | 100.3 | 100.2 | 100.3 | 100.3 | 100.2 | 100.2 |

According to the performance test results in Table 3, the test tires of Working Examples 1 to 14 that satisfied Formula <1> had better RRC indices and fuel efficiency indices than the Conventional Example. From these performance test results, it has been confirmed that of the tire sizes tested, the fuel consumption of tire size 165/55R20 (Working Example 10) was sufficiently improved relative to that of tire size 205/55R16. Therefore, in the following tests for tread pattern, this tire size was used.

Working Examples 15 to 17 and Comparative Examples 1 and 2

The pneumatic tires according to Working Examples 15 to 17 and Comparative Examples 1 and 2 had tire sizes of 165/55R20. The pneumatic tire according to Comparative Example 1 was a test tire for which only the tire size was changed from the Conventional Example. Note that the pneumatic tire of Comparative Example 1 was the reference tire for steering stability as described above. In other words, in the present technology, the tire size is changed so that the width is narrower and the diameter is larger for the rolling resistance, and the state in which the steering stability is reduced accordingly is taken as the reference. Also, the extent to which the steering stability of the pneumatic tires according to the Working Examples has been improved relative to Comparative Example 1 was evaluated.

The pneumatic tires of Working Examples 15 to 17 and Comparative Example 2 were test tires in which the amount of depression $\theta$ was 3° and "TDW/SW" was distributed in a range of 0.75 to 0.9. Here, Working Examples 15 to 17 satisfied the relationships of all of Formulas <1> to <4>, but Comparative Example 2 did not satisfy the relationship of Formula <2>.

For the pneumatic tires of the Conventional Example, Working Examples 15 to 17, and Comparative Example 2, performance tests relating to the fuel efficiency index and the steering stability were performed. Table 4 shows numerical values of the dimensions for each test tire, and the performance test results.

TABLE 4

| | Conventional Example | Comparative Example 1 | Comparative Example 2 | Working Example 15 | Working Example 16 | Working Example 17 |
|---|---|---|---|---|---|---|
| Nominal Width | 205 | 165 | 165 | 165 | 165 | 165 |
| Aspect ratio | 55 | 55 | 55 | 55 | 55 | 55 |
| Inner diameter (inches) | 16 | 20 | 20 | 20 | 20 | 20 |
| Outer diameter (mm) | 632 | 695 | 695 | 695 | 695 | 695 |
| SW/OD | 0.33 | 0.24 | 0.24 | 0.24 | 0.24 | 0.24 |
| TDW/SW | 0.75 | 0.75 | 0.75 | 0.8 | 0.85 | 0.9 |
| Amount of depression $\theta$ (°) | 5.2 | 5.2 | 3 | 3 | 3 | 3 |
| Fuel efficiency index | 100 | 100.2 | 100.2 | 100.2 | 100.2 | 100.2 |
| Steering stability | 110 | 100 | 97 | 102 | 103 | 104 |

According to the performance test results of Table 4, the test tires of Working Examples 15 to 17 that satisfied the relationships of Formulas <1> to <3> had a higher fuel efficiency index than the Conventional Example, and a higher steering stability than the other test tires including Comparative Example 1. In other words, these test tires had reduced rolling resistance, and the degradation in steering stability performance associated with this was improved.

Working Examples 18 to 20 and Comparative Examples 3 and 4

The pneumatic tires of the Working Examples 18 to 20 and Comparative Examples 3 and 4 were test tires with a tire size of 165/55R20, "TDW/SW" was 0.9, and the amount of depression θ was distributed in the range of 1 to 5°. Here, the pneumatic tires of Working Examples 18 to 20 satisfied all of the relationships in Formulas <1> to <3>; however, the pneumatic tires of Comparative Examples 3 and 4 did not satisfy the relationship in Formula <3>.

For the pneumatic tires of the Conventional Example, Working Examples 18 to 20, and Comparative Examples 1, 3, and 4, performance tests relating to the fuel efficiency index and the steering stability were performed. Table 5 shows numerical values of the dimensions for each test tire, and the performance test results.

TABLE 5

|  | Conventional Example | Comparative Example 1 | Comparative Example 3 |
|---|---|---|---|
| Nominal Width | 205 | 165 | 165 |
| Aspect ratio | 55 | 55 | 55 |
| Inner diameter (inches) | 16 | 20 | 20 |
| Outer diameter (mm) | 632 | 695 | 695 |
| SW/OD | 0.33 | 0.24 | 0.24 |
| TDW/SW | 0.75 | 0.75 | 0.9 |
| Amount of depression θ (°) | 5.2 | 5.2 | 5 |
| Fuel efficiency index | 100 | 100.2 | 100.2 |
| Steering stability | 110 | 100 | 98 |

|  | Working Example 18 | Working Example 19 | Working Example 20 | Comparative Example 4 |
|---|---|---|---|---|
| Nominal Width | 165 | 165 | 165 | 165 |
| Aspect ratio | 55 | 55 | 55 | 55 |
| Inner diameter (inches) | 20 | 20 | 20 | 20 |

TABLE 5-continued

| Outer diameter (mm) | 695 | 695 | 695 | 695 |
|---|---|---|---|---|
| SW/OD | 0.24 | 0.24 | 0.24 | 0.24 |
| TDW/SW | 0.9 | 0.9 | 0.9 | 0.9 |
| Amount of depression θ (°) | 4 | 3 | 2 | 1 |
| Fuel efficiency index | 100.2 | 100.2 | 100.2 | 100.2 |
| Steering stability | 102 | 104 | 104 | 99 |

According to the performance test results of Table 5, the test tires of Working Examples 18 to 20 that satisfied the relationships of Formulas <1> to <3> had a higher fuel efficiency index than the Conventional Example, and a higher steering stability than the other test tires including Comparative Example 1. In other words, these test tires had reduced rolling resistance, and the degradation in steering stability performance associated with this was improved.

Working Examples 21 to 30

The pneumatic tires of Working Examples 21 to 30 were test tires with a tire size of 165/55R20, "Rc/Rsh" was distributed in a range of 6 to 12, and "L/(TDW/2)"" was distributed in a range of 0.45 to 0.9. Here, the pneumatic tires of Working Examples 21 to 30 satisfied all of the relationships in Formulas <1> to <3> and in addition the pneumatic tires of Working Examples 22 to 29 satisfied the relationship in both Formulas <4> and <5>. However, the pneumatic tires of Working Examples 21 and 30 did not satisfy the relationship of Formula <5>.

For the pneumatic tires of Conventional Example, Comparative Example 1, and Working Examples 21 to 30, performance tests relating to the fuel efficiency index and the steering stability were performed. Table 6 illustrates the values and conditions relating to the dimensions of each test tire and the performance test results.

TABLE 6

|  | Conventional Example | Comparative Example 1 | Working Example 21 | Working Example 22 | Working Example 23 | Working Example 24 |
|---|---|---|---|---|---|---|
| Nominal Width | 205 | 165 | 165 | 165 | 165 | 165 |
| Aspect ratio | 55 | 55 | 55 | 55 | 55 | 55 |
| Inner diameter (inches) | 16 | 20 | 20 | 20 | 20 | 20 |
| Outer diameter (mm) | 632 | 695 | 695 | 695 | 695 | 695 |
| SW/OD | 0.33 | 0.24 | 0.24 | 0.24 | 0.24 | 0.24 |
| TDW/SW | 0.7 | 0.7 | 0.9 | 0.9 | 0.9 | 0.9 |
| Amount of depression θ (°) | 5 | 5 | 3 | 3 | 3 | 3 |
| Rc/Rsh | 3.5 | 3.5 | 9 | 6 | 6 | 7 |
| L/(TDW/2) | 0.45 | 0.45 | 0.45 | 0.55 | 0.65 | 0.65 |
| Fuel efficiency index | 100 | 100.2 | 100.2 | 100.2 | 100.2 | 100.2 |
| Steering stability | 110 | 100 | 101 | 105 | 105 | 106 |

|  | Working Example 25 | Working Example 26 | Working Example 27 | Working Example 28 | Working Example 29 | Working Example 30 |
|---|---|---|---|---|---|---|
| Nominal Width | 165 | 165 | 165 | 165 | 165 | 165 |

TABLE 6-continued

| | | | | | | |
|---|---|---|---|---|---|---|
| Aspect ratio | 55 | 55 | 55 | 55 | 55 | 55 |
| Inner diameter (inches) | 20 | 20 | 20 | 20 | 20 | 20 |
| Outer diameter (mm) | 695 | 695 | 695 | 695 | 695 | 695 |
| SW/OD | 0.24 | 0.24 | 0.24 | 0.24 | 0.24 | 0.24 |
| TDW/SW | 0.9 | 0.9 | 0.9 | 0.9 | 0.9 | 0.9 |
| Amount of depression θ (°) | 3 | 3 | 3 | 3 | 3 | 3 |
| Rc/Rsh | 9 | 11 | 12 | 9 | 6 | 9 |
| L/(TDW/2) | 0.65 | 0.65 | 0.75 | 0.75 | 0.75 | 0.9 |
| Fuel efficiency index | 100.2 | 100.2 | 100.2 | 100.2 | 100.2 | 100.2 |
| Steering stability | 106 | 105.5 | 105 | 105 | 105 | 101 |

According to the performance test results of Table 6, the pneumatic tires of Working Examples 21 to 30, which satisfied the relationship of Formula <4>, had steering stability superior to that of the pneumatic tire of Comparative Example 1. In addition the pneumatic tires of Working Examples 22 to 29, which satisfied the relationships of both Formulas <4> and <5>, had steering stability superior to that of the pneumatic tires of Working Examples 21 and 30, which did not satisfy the relationship of Formula <5>.

Working Examples 31 to 39

The pneumatic tires of Working Examples 32 to 39 were test tires that had a tire size of 165/55R20, and had a reinforcing layer 40 provided between the carcass layer 20 and the belt layer 30 as described in the second embodiment. The cords of the reinforcing layer 40 included in the pneumatic tires of these Working Examples were steel cords formed by twisting together three monofilament cords of diameter 0.28 mm.

The pneumatic tires of Working Examples 31 and 32 were test tires that differed only in the absence or presence of the reinforcing layer 40. The pneumatic tire of Working Example 31 did not have the reinforcing layer 40 and the pneumatic tire of Working Example 32 did have the reinforcing layer 40.

In the pneumatic tires of Working Examples 32 to 39, the width in the tire width direction of the reinforcing layer 40 was distributed in the range 15% to 85% of the width in the tire width direction of the second belt layer 30B, and the groove area ratio GR was distributed in the range 15% to 30%.

For the pneumatic tires of the Conventional Example, Working Examples 31 to 39, and Comparative Example 1, performance tests relating to the fuel efficiency index and the steering stability were performed. Table 7 shows numerical values of the dimensions for each test tire, and the performance test results.

TABLE 7

| | Conventional Example | Comparative Example 1 | Working Example 31 | Working Example 32 | Working Example 33 | Working Example 34 |
|---|---|---|---|---|---|---|
| Nominal Width | 205 | 165 | 165 | 165 | 165 | 165 |
| Aspect ratio | 55 | 55 | 55 | 55 | 55 | 55 |
| Inner diameter (inches) | 16 | 20 | 20 | 20 | 20 | 20 |
| Outer diameter (mm) | 632 | 695 | 695 | 695 | 695 | 695 |
| SW/OD | 0.33 | 0.24 | 0.24 | 0.24 | 0.24 | 0.24 |
| TDW/SW | 0.7 | 0.7 | 0.9 | 0.9 | 0.9 | 0.9 |
| Amount of depression θ (°) | 5 | 5 | 3 | 3 | 3 | 3 |
| Rc/Rsh | 3.5 | 3.5 | 9 | 9 | 9 | 9 |
| L/(TDW/2) | 0.45 | 0.45 | 0.65 | 0.65 | 0.65 | 0.65 |
| Reinforcing layer width (%) | — | — | — | 50 | 15 | 30 |
| Groove area ratio (%) | 30 | 30 | 30 | 30 | 20 | 20 |
| Fuel efficiency index | 100 | 100.2 | 100.2 | 100.2 | 100.2 | 100.2 |
| Steering stability | 110 | 100 | 103 | 105 | 104 | 107 |

| | Working Example 35 | Working Example 36 | Working Example 37 | Working Example 38 | Working Example 39 |
|---|---|---|---|---|---|
| Nominal Width | 165 | 165 | 165 | 165 | 165 |
| Aspect ratio | 55 | 55 | 55 | 55 | 55 |
| Inner diameter (inches) | 20 | 20 | 20 | 20 | 20 |
| Outer diameter (mm) | 695 | 695 | 695 | 695 | 695 |
| SW/OD | 0.24 | 0.24 | 0.24 | 0.24 | 0.24 |

TABLE 7-continued

| | | | | | |
|---|---|---|---|---|---|
| TDW/SW | 0.9 | 0.9 | 0.9 | 0.9 | 0.9 |
| Amount of depression θ (°) | 3 | 3 | 3 | 3 | 3 |
| Rc/Rsh | 9 | 9 | 9 | 9 | 9 |
| L/(TDW/2) | 0.65 | 0.65 | 0.65 | 0.65 | 0.65 |
| Reinforcing layer width (%) | 50 | 70 | 50 | 50 | 85 |
| Groove area ratio (%) | 20 | 20 | 15 | 25 | 20 |
| Fuel efficiency index | 100.2 | 100.2 | 100.2 | 100.2 | 100.2 |
| Steering stability | 109 | 108 | 109 | 107 | 103 |

According to the performance test results of Table 7, the pneumatic tires in which the width in the tire width direction of the reinforcing layer 40 was from 25% to 75% both inclusive of the width in the tire width direction of the second belt layer 30B, or the groove area ratio in the ground contact region was 25% or less, had improved steering stability compared with the pneumatic tires having dimensional parameters outside these ranges.

Note that the present technology has been described in detail based upon specific embodiments, but a person skilled in the art can make various changes and modifications without deviating from the scope of the claims and the concepts of the present technology.

The present technology is defined as follows.

(1) A pneumatic tire, comprising: a pair of bead portions; sidewall portions connected to the pair of bead portions; and a tread portion connected to the sidewall portions;
wherein a ratio between a total width SW and an outer diameter OD of the pneumatic tire satisfies the relationship $SW/OD \leq 0.3$ a tread profile that is a profile line of a surface of the tread portion in cross-sectional view in a tire meridian direction is formed by connecting a plurality of arcs with different radii of curvature, including a center portion arc located in a center in a tire width direction, side portion arcs located on the outermost side in the tire width direction of the tread portion, and shoulder side arcs connected to the side portion arcs and located on the outer side in the tire width direction next to the side portion arcs,
in a cross-sectional view in the tire meridian direction, when a point of intersection of an extended line of the shoulder side arc and an extended line of the side portion arc on a first side is a first side first reference point, a point of intersection of a straight line passing through the first side first reference point perpendicular to the tread profile and the tread profile is a first side second reference point, a point of intersection of an extended line of the shoulder side arc and an extended line of the side portion arc on a second side is a second side first reference point, a point of intersection of a straight line passing through the second side first reference point perpendicular to the tread profile and the tread profile is a second side second reference point, a length along the tread profile from the first side second reference point to the second side second reference point is a developed tread width TDW, a point of intersection of a tire equatorial plane and the tread profile is a profile center, and an angle formed between a straight line that connects the second reference points and the profile center and a straight line parallel to the tire width direction is an amount of depression θ, the relationships $0.8 \leq TDW/SW < 1$ $1.5° \leq θ \leq 4.5°$ are satisfied.

(2) The pneumatic tire according to (1), wherein when a radius of curvature of the center portion arc is Rc, and a radius of curvature of the shoulder side arc is Rsh,
the tread portion is formed so as to satisfy the relationship $5 \leq Rc/Rsh \leq 15$.

(3) The pneumatic tire according to (2), wherein when an arc length of the center portion arc from the profile center to an inner side end in the tire width direction of the shoulder side arc is L, the tread portion is formed so as to satisfy the relationship $0.5 \leq L/(TDW/2) \leq 0.8$.

(4) The pneumatic tire according to any one of (1) to (3), further comprising a carcass layer that in a cross-sectional view in a tire meridian direction extends between the bead portions via the sidewall portions and the tread portion, and
a reinforcing layer provided in the tread portion on the outer side of the carcass layer in the tire radial direction, the reinforcing layer being formed from cords extending substantially 90° with respect to a tire circumferential direction covered with rubber, wherein
the reinforcing layer is included at least in a tire width direction region defined on the tread profile by the center portion arc.

(5) The pneumatic tire according to (4), further comprising a belt layer in the tread portion located on the outer side of the carcass layer in the tire radial direction, wherein
a width in the tire width direction of the reinforcing layer is from 25% to 75% both inclusive of a width in the tire width direction of a belt layer of the belt layer on the outermost side in the tire radial direction.

(6) The pneumatic tire according to any one of (1) to (5), wherein the tread portion has a tread pattern formed by grooves, and the groove area ratio GR in a ground contact region is 25% or less.

(7) The pneumatic tire according to any one of (1) to (6), wherein the aspect ratio of the pneumatic tire is 55% or more.

What is claimed is:

1. A pneumatic tire, comprising: a pair of bead portions; sidewall portions connected to the pair of bead portions; and a tread portion connected to the sidewall portions; wherein
a ratio between a total width SW and an outer diameter OD of the pneumatic tire satisfies a relationship $SW/OD \leq 0.3$,
a tread profile that is a profile line of a surface of the tread portion in cross-sectional view in a tire meridian direction is formed by connecting a plurality of arcs with different radii of curvature, including a center portion arc located in a center in a tire width direction, side portion arcs located on an outermost side in the tire arcs connected to the side portion arcs and located on the outer side in the tire width direction next to the side portion arcs, in a cross-sectional view in the tire meridian direction, a point of intersection of an extended line of the shoulder side arc and an extended line of the side portion arc on a first side is a first side first reference point, a point of intersection of a straight line passing through the first side first reference point perpendicular to the tread profile and the tread profile is a first side second reference point, a point of intersection of an extended line of the shoulder side arc and an extended line of the side portion arc on a second side is a second side first reference point, a point of intersection of a straight line passing through the second side first reference point perpendicular to the tread profile and the tread profile is a second side second reference point, a length along the tread profile from the first side second reference point to the second side second reference point is a developed tread width TDW, a point of intersection of a tire equatorial plane and the tread profile is a profile center, and an angle formed between a straight line that connects the second reference points and the profile center and a straight line parallel to the tire width direction is an amount of depression θ, relationships 0.85<TDW/SW<1 and 1.5°≤θ≤4.5° are satisfied, an arc length of the center portion arc from the profile center to an inner side end in the tire width direction of each shoulder side arc is L, the tread portion is formed so as to satisfy a relationship 0.71≤L/(TDW/2)≤0.8, a radius of curvature of the center portion arc is Rc, and a radius of curvature of each shoulder side arc is Rsh, and the tread portion is formed so as to satisfy a relationship 8≤Rc/Rsh≤15.

2. The pneumatic tire according to claim 1, further comprising a carcass layer that in a cross-sectional view in the tire meridian direction extends between the bead portions via the sidewall portions and the tread portion, and a reinforcing layer provided in the tread portion on an outer side of the carcass layer in a tire radial direction, the reinforcing layer being formed from cords extending substantially 90° with respect to a tire circumferential direction covered with rubber, wherein the reinforcing layer is included at least in a tire width direction region defined on the tread profile by the center portion arc.

3. The pneumatic tire according to claim 2, further comprising a belt layer in the tread portion located on the outer side of the carcass layer in the tire radial direction, wherein a width in the tire width direction of the reinforcing layer is from 25% to 49% both inclusive of a width in the tire width direction of a radially outermost belt ply of the belt layer.

4. The pneumatic tire according to claim 3, wherein the tread portion has a tread pattern formed by grooves, and a groove area ratio GR in a ground contact region is 25% or less.

5. The pneumatic tire according to claim 4, wherein an aspect ratio of the pneumatic tire is 55% or more.

6. The pneumatic tire according to claim 2, further comprising a belt layer in the tread portion located on the outer side of the carcass layer in the tire radial direction, wherein a width in the tire width direction of the reinforcing layer is from 25% to 75% both inclusive of a width in the tire width direction of a radially outermost belt ply of the belt layer.

7. The pneumatic tire according to claim 6, wherein the tread portion has a tread pattern formed by grooves, and a groove area ratio GR in a ground contact region is 25% or less.

8. The pneumatic tire according to claim 7, wherein an aspect ratio of the pneumatic tire is 55% or more.

9. The pneumatic tire according to claim 1, wherein the tread portion has a tread pattern formed by grooves, and a groove area ratio GR in a ground contact region is from 21% to 25%.

10. The pneumatic tire according to claim 1, wherein an aspect ratio of the pneumatic tire is 55% or more.

11. The pneumatic tire according to claim 1, wherein 0.9≤TDW/SW<1.

12. The pneumatic tire according to claim 1, wherein the ratio between the total width SW and the outer diameter OD of the pneumatic tire satisfies SW/OD≤0.24.

13. The pneumatic tire according to claim 1, wherein 1.5°≤θ≤2.8° is satisfied.

14. The pneumatic tire according to claim 1, wherein the tread portion is formed so as to satisfy 8≤Rc/Rsh≤9.

* * * * *